(12) United States Patent
Bellamy et al.

(10) Patent No.: US 7,635,116 B2
(45) Date of Patent: Dec. 22, 2009

(54) METHOD OF MANUFACTURING AN ANTI-VIBRATION DEVICE, AND AN ANTI-VIBRATION DEVICE OBTAINABLE BY THE METHOD

(75) Inventors: Alain Bellamy, Naveil (FR); Pascal Petit, Beaugency (FR); Olivier Come, Saint Jean de Braye (FR)

(73) Assignee: Hutchinson, Paris (FR)

( * ) Notice: Subject to any disclaimer, the term of this patent is extended or adjusted under 35 U.S.C. 154(b) by 24 days.

(21) Appl. No.: 11/300,638

(22) Filed: Dec. 14, 2005

(65) Prior Publication Data

US 2006/0157633 A1 Jul. 20, 2006

(30) Foreign Application Priority Data

Jan. 12, 2005 (FR) .................................. 05 00324

(51) Int. Cl.
*F16F 13/00* (2006.01)
*F16M 7/00* (2006.01)

(52) U.S. Cl. ...................... 267/140.13; 267/140.11; 248/562; 248/521; 248/550; 29/521

(58) Field of Classification Search ............ 267/140.11, 267/140.13, 140.15; 248/562, 521, 550; 29/521
See application file for complete search history.

(56) References Cited

U.S. PATENT DOCUMENTS

| | | | | |
|---|---|---|---|---|
| 4,998,345 A | * | 3/1991 | Funahashi et al. ......... 29/897.2 |
| 5,407,169 A | * | 4/1995 | Tournier ................ 267/140.11 |
| 5,636,826 A | | 6/1997 | Nakagaki et al. |
| 6,289,571 B1 | * | 9/2001 | Ozawa et al. ................. 29/521 |
| 6,598,865 B1 | * | 7/2003 | Kato .................... 267/140.13 |
| 6,669,182 B2 | * | 12/2003 | Hibi et al. .............. 267/140.13 |
| 2004/0021259 A1 | | 2/2004 | Visage et al. |
| 2004/0188901 A1 | * | 9/2004 | Debolt et al. ......... 267/140.13 |
| 2004/0188903 A1 | * | 9/2004 | Goto et al. ............ 267/140.13 |

FOREIGN PATENT DOCUMENTS

| | | |
|---|---|---|
| EP | 0187188 A3 * | 7/1986 |
| EP | 1 605 184 A1 | 12/2005 |
| JP | 9-72365 | 3/1997 |
| JP | 11-257413 | 9/1999 |
| JP | 2000-74128 | 3/2000 |
| JP | 2001-50331 | 2/2001 |
| WO | WO 02/095259 A1 | 11/2002 |

OTHER PUBLICATIONS

French Search Report, FR 0500324; report dated Aug. 26, 2005.

* cited by examiner

*Primary Examiner*—Robert A Siconolfi
*Assistant Examiner*—Mahbubur Rashid
(74) *Attorney, Agent, or Firm*—Miller Matthias & Hull

(57) ABSTRACT

A method of manufacturing an antivibration device that comprises a hydraulic element, the method including at least one overmolding step during which a plastics material connection piece is overmolded over the hydraulic element after said hydraulic element has been closed.

22 Claims, 4 Drawing Sheets

METHOD OF MANUFACTURING AN ANTI-VIBRATION DEVICE, AND AN ANTI-VIBRATION DEVICE OBTAINABLE BY THE METHOD

FIELD OF THE INVENTION

The present invention relates to methods of manufacturing antivibration devices, and to antivibration devices obtainable by such methods.

More particularly, the invention relates to a method of manufacturing an antivibration device for being interposed between first and second elements for damping and connection purposes, and antivibration device comprising a hydraulic element, itself comprising:

first and second strength members adapted to be fastened (directly or indirectly) respectively to the first and second elements;
an elastomer body interconnecting the first and second strength members; and
a leaktight hydraulic compartment filled with liquid, defined by the elastomer body and by a closure wall fastened to the second strength member, the method presenting at least the following steps:
a) assembling the elastomer body with the first and second strength members; and
c) fastening the closure wall to the second strength member.

BACKGROUND OF THE INVENTION

Known manufacturing methods of this type present the drawback of requiring different manufacturing tools depending on the application of the antivibration device since in general at least one of the two strength members, e.g. the second strength member, differs from one application to another in order to be capable of being fastened to the corresponding vibrating element.

OBJECTS AND SUMMARY OF THE INVENTION

A particular object of the present invention is to mitigate that drawback.

To this end, according to the invention, a method of the kind in question further comprises an overmolding step e) subsequent to the step c) and consisting in overmolding at least one connection piece of plastics material on at least one of the first and second strength members.

By means of these provisions, it is possible to use standardized machines for assembling the hydraulic elements, which elements have the connection piece of plastics material overmolded thereon subsequently, the piece being of a shape that is specific to the desired fastening, as a function of the application. Thus, the standardization of the manufacturing method is improved for all applications using the same hydraulic elements.

In addition, the overall size of the hydraulic element is reduced (in particular the size of at least one of the strength members) throughout the major portion of its manufacturing process, thereby facilitating industrial implementation of these steps and also facilitating the transport and storage of hydraulic elements prior to implementing the overmolding step e).

In various implementations of the method of the invention, recourse may optionally also be had to one or more of the following provisions:

the method further comprises a step b) of filling the hydraulic compartment with liquid, the step b) being implemented between the steps a) and c), and the closure wall closing the hydraulic compartment in leaktight manner during the step c);

the method further comprises steps b) of filling the hydraulic compartment with liquid through a filler duct, and d) of closing the hydraulic compartment in leaktight manner by closing the filler duct, the steps b) and d) being performed after step c);

the steps b) and d) are performed after the step e);

the steps b) and d) are performed before the step e);

the second strength member includes a closure zone for securing said second strength member to the closure wall, and during overmolding step e) the plastics material connection piece is overmolded at least in part over said closure zone;

the plastics material connection piece is secured to fastener members adapted to be fastened to the second element, which fastener members have the plastics material connection piece overmolded thereon during the overmolding step e);

during step a), the first and second strength members are coated in an elastomer layer;

the plastics material connection piece is secured to a stroke limiter member adapted to limit relative movement between the first and second strength members;

the limiter member is molded out of plastics material during the overmolding step e) integrally with the connection piece;

the elastomer body is prestressed in compression during overmolding step e) and the limiter member maintains compression prestress on the elastomer body after step e);

the elastomer body is substantially bell-shaped, extending along a central axis between a top secured to the first strength member and an annular base secured to the second strength member, the plastics material connection piece is overmolded on the second strength member and extends substantially perpendicularly to said central axis, and the limiter member of arcuate shape comprises:

two ends secured to the plastics material connection piece on either side of the elastomer body; and a top covering the top of the elastomer body and the first strength member;

the hydraulic compartment includes a working chamber filled with liquid and a compensation chamber filled with liquid and separated from the working chamber by a partition, and defined at least in part by said closure wall, said closure wall being flexible; and during step c), at least a closure zone belonging to the second strength member is crimped onto the flexible wall and the partition, and during the overmolding step e), the plastics material connection piece is overmolded on the second strength member so as to cover said crimped closure zone, at least in part.

Furthermore, the invention also provides an antivibration device suitable for being made by a method according to any preceding claim, the device being for interposing between first and second elements for damping and connection purposes, said antivibration device comprising a hydraulic element, itself comprising:

first and second strength members adapted to be fastened respectively to the first and second elements;

an elastomer body interconnecting the first and second strength members; and a leaktight hydraulic compartment filled with liquid, defined by the elastomer body and by a closure wall, said closure wall being secured to the second strength member by at least one closure zone, the device further comprising a connection piece of plastics material overmolded onto the second strength member and covering the closure zone at least in part.

By means of these provisions, the leaktightness of, such devices can optionally be reinforced, since the retention of the closure zone in place is reinforced by overmolding the connection piece made of plastics material.

In various embodiments of the device of the invention, recourse may optionally also be had to one or more of the following provisions:

the plastics material connection piece is secured to fastener members suitable for being fastened to the second element, said fastener members being overmolded by the plastics material connection piece;

the elastomer body includes a fine layer of elastomer coating the second strength member at least in part and interposed between the second strength member and the connection piece;

the hydraulic element presents a peripheral groove into which the connection piece penetrates;

the plastics material connection piece is secured to a stroke limiter member adapted to limit relative movement between the first and second strength members;

the limiter member is integrally molded but of plastics material together with the connection piece;

the limiter member maintains compression prestress on the elastomer body;

the elastomer body is substantially bell-shaped, extending along a central axis between a top secured to the first strength member and an annular base secured to the second strength member, the plastics material connection piece is overmolded on the second strength member and extends substantially perpendicularly to said central axis, and the limiter member of arcuate shape comprising:

two ends secured to the plastics material connection piece on either side of the elastomer body; and a top covering the top of the elastomer body and the first strength member;

the hydraulic compartment comprises:

firstly a working chamber defined by the elastomer body; and secondly a compensation chamber filled with liquid, separated from the working chamber by a partition, and defined at least in part by the closure wall, said closure wall being flexible; and the closure zone belongs to the second strength member, and said closure zone is crimped to the flexible wall and the partition.

BRIEF DESCRIPTION OF THE DRAWINGS

Other characteristics and advantages of the invention appear from the following description of an embodiment given by way of non-limiting example and with reference to the accompanying drawings.

In the drawings.

MORE DETAILED DESCRIPTION

In the various figures, the same references designate elements that are identical or similar.

Figure 1:
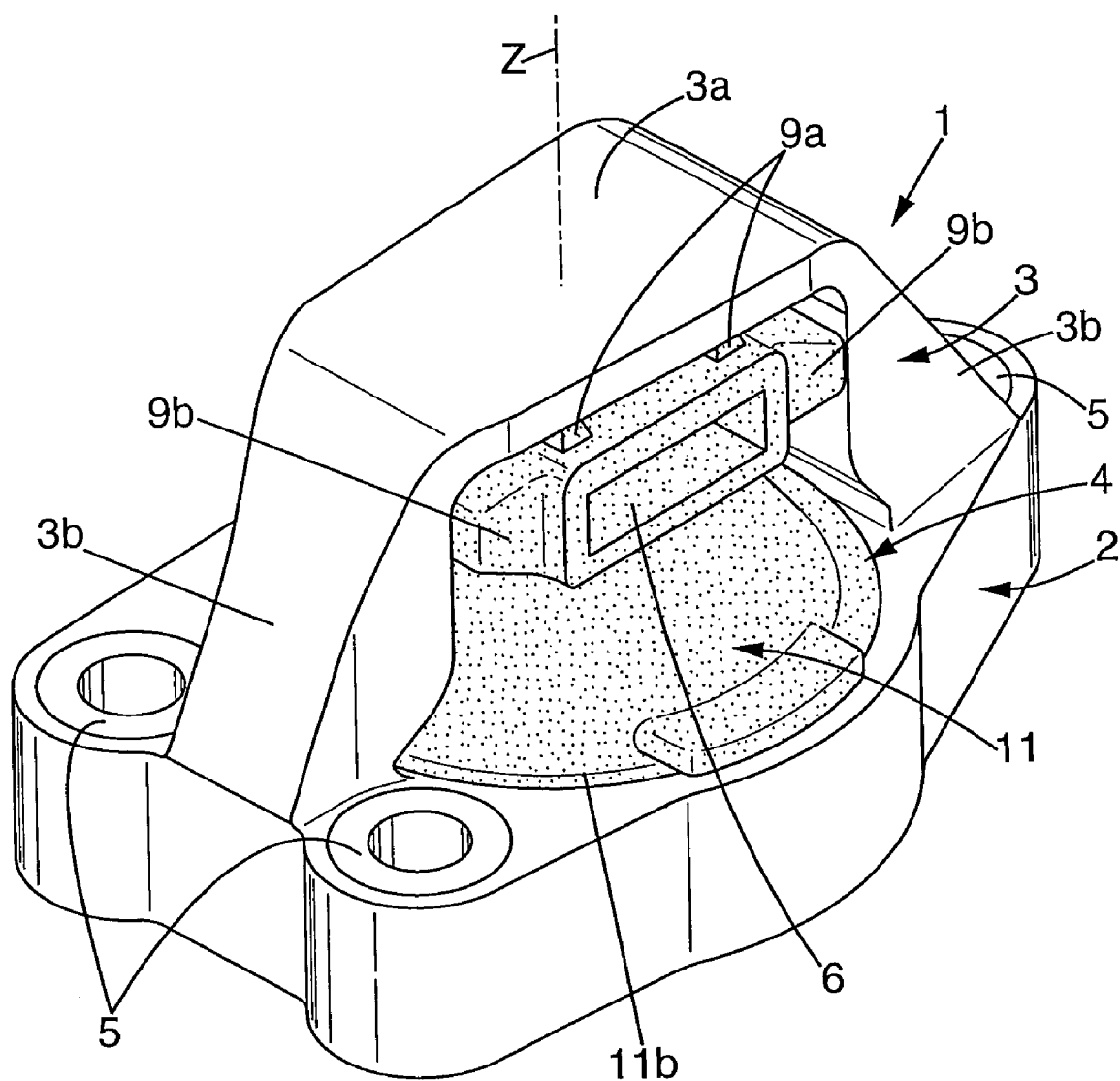
FIG. 1 is an overall view of a device in accordance with the invention.

In FIG. 1, there is shown an antivibration device 1 in accordance with the invention. The antivibration device 1 comprises a plastics connection piece 2, e.g. made of polyamide 6-6, possibly filled with glass or other fibers, and a hydraulic element 4. The hydraulic element 4 described in detail below includes a fastener device, such as, for example, a fastener cavity 6 suitable for receiving in mutual engagement a connection member secured to a vibrating element such as a vehicle engine.

Figure 3:
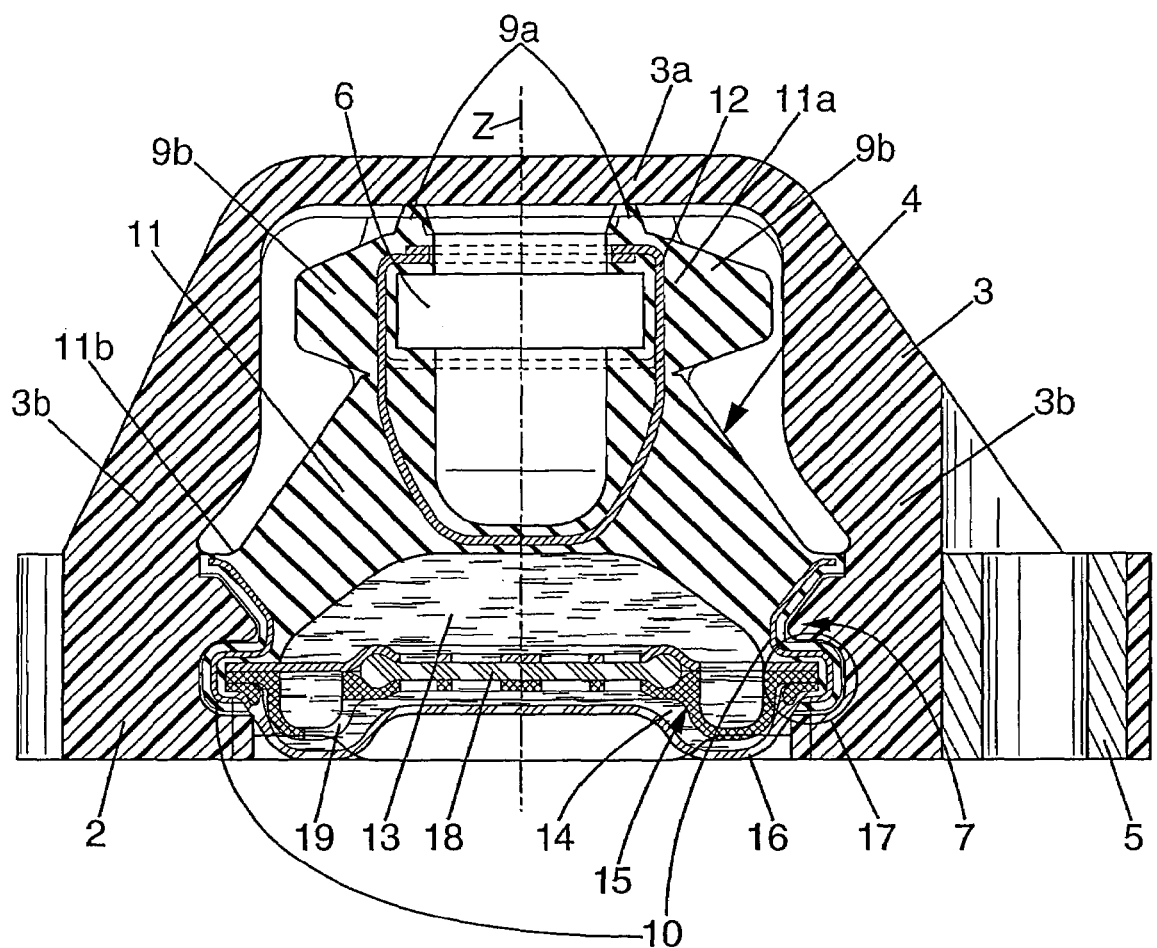
FIG. 3 is a vertical section through the FIG. 1 device.

FIG. 3 is a section through the antivibration device 1 of FIG. 1. The hydraulic element 4 may comprise an elastomer body 11 of generally frustoconical shape, e.g. a rubber body. This elastomer body 11 converges about a central axis Z between:

an annular base 11b covering a rigid annular strength member 10; and a top 11a surrounding a top strength member 12, thus stiffening the fastener cavity 6.

A hydraulic compartment is formed under the elastomer body 11. This hydraulic compartment may comprise a working chamber 13 and a compensation chamber 14, it is filled with liquid, e.g. glycol or the like, and it can deform under the action of vibration being transmitted via the elastomer body 11. The compensation chamber 14 filled with liquid communicates with the working chamber 13, e.g. via a separation partition 15. This separation partition 15 may conventionally comprise a decoupling flap 18 and a constricted passage 19 via which the working chamber 13 communicates with the compensation chamber 14. The compensation chamber 14 is closed by a flexible wall 16, e.g. a compensation bellows, capable of deforming under the influence of liquid coming from the working chamber 13 and going towards the compensation chamber 14. By way of example, the rigid strength member 10 is crimped onto the separation partition 15 and the flexible wall 16 by folding over at least a portion of the strength member 10 so as to form a crimped closure zone 17 (an annular ring or tabs). The connection piece 2 may cover this closure zone 17 at least in part so as to reinforce the closure.

The connection piece 2 can be overmolded onto either one of the strength members, e.g. the strength member 10. This strength member 10 may present a peripheral groove defining an outer peripheral groove 7 on the hydraulic element 4. The plastics material of the connection piece 2 penetrates into the groove 7, thereby reinforcing the fastening of said connection piece 2 on the hydraulic element 4. The connection piece 2 may include fastener members 5, e.g. metal bushings, suitable for having screws or the like pass therethrough for the purpose of fastening the connection piece 2 on an element such as a vehicle chassis. These fastener members 5 likewise have the connection piece 2 overmolded thereon.

A fine layer of the elastomer of the elastomer body 11 can cover the annular strength member 10 so as to be interposed between said annular strength member 10 and the connection piece 2, thereby reinforcing the vibratory insulation obtained by the antivibration device. In addition, this fine layer of elastomer provides thermal filtering while the plastics connection piece 2 is being overmolded on the hydraulic element 4, thus making it possible to avoid damaging the bonding between the strength member 10 and the elastomer body 11.

A stroke limiter member 3, e.g. of arcuate shape with a top 3a and two ends 3b secured to the connection piece 2, can serve to limit relative movement between the strength members 10 and 12 of the hydraulic element 4. For this purpose, the hydraulic element 4 includes:

upwardly-directed studs 9a suitable for coming into abutment against the bottom zone of the top 3a of the limiter member during movement along the axis Z; and side protrusions 9b that can come into abutment against the side branches 3b of the limiter member 3.

As shown in FIG. 3, the limiter member 3 and the connection piece 2 may be constituted by a single piece overmolded around the hydraulic element 4.

In addition, the hydraulic element 4 may optionally be prestressed in compression by the limiter member 3 prior to being mounted in a vehicle. Under such circumstances, the top 3a presses against the hydraulic element 4 via the studs 9a.

This prestress is a consequence of the presence of the stroke limiter member 3. In order to prevent strokes of too great an amplitude, the top 3a of the stroke limiter member is placed below the level of the unloaded equilibrium position of the antivibration device, thereby exerting stress on the antivibration device since it is moved away from its equilibrium position. Under the effect of the load it is to support, the equilibrium point is lowered to below the top 3a.

Figure 2:
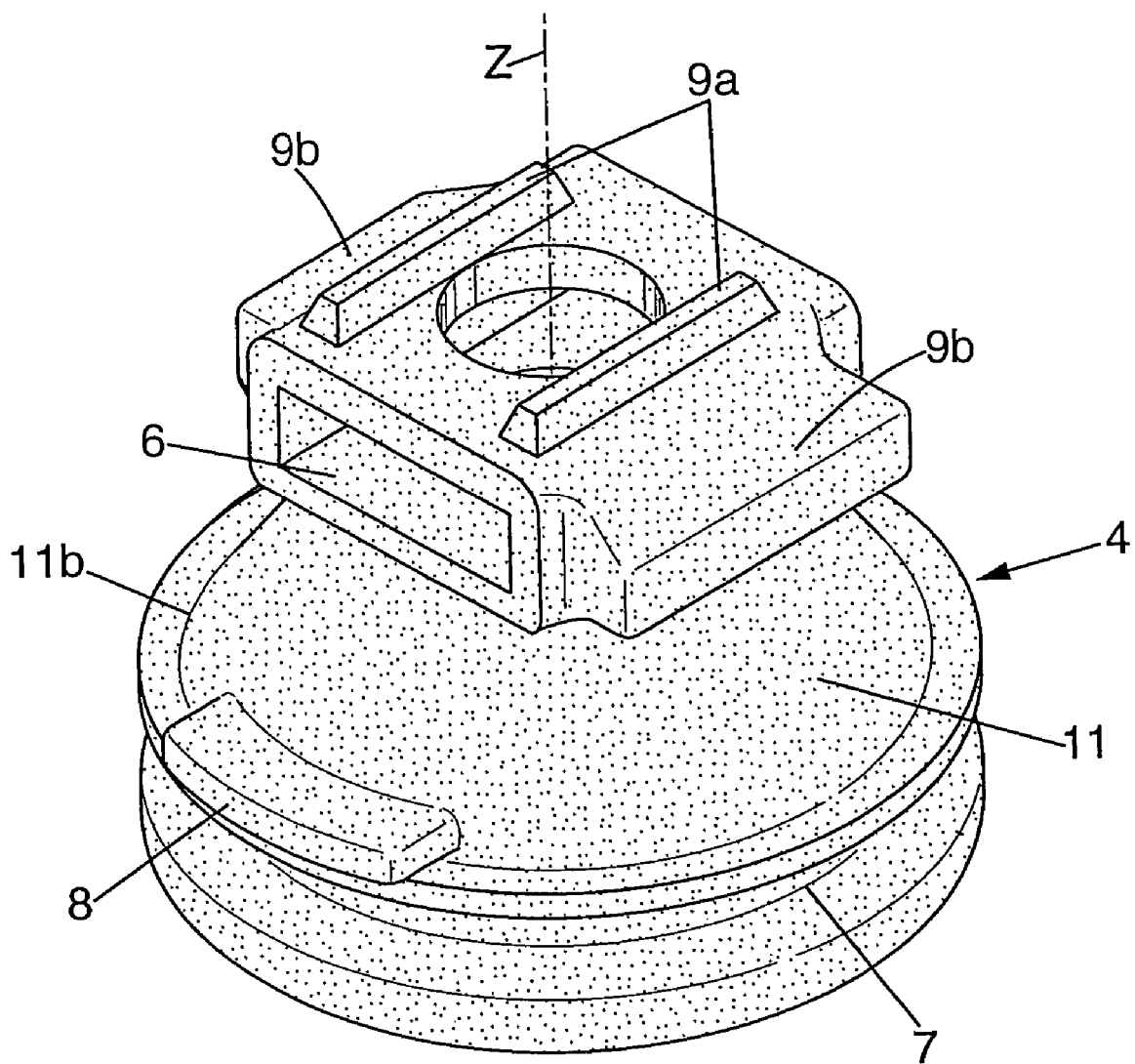
FIG. 2 shows an assembled hydraulic element prior to the connection piece being overmolded thereon in accordance with the invention.

During manufacture of the antivibration device 1, the elastomer body 11 is initially formed around the two strength members 10 and 12, e.g. by molding. Thereafter the separately-assembled partition 15 can be placed in the elastomer body 11, in its base 11b. Thereafter, the hydraulic compartment is filled with liquid such as glycol so that the working and compensation chambers 13 and 14 are filled. Finally, a complete hydraulic element 4 as shown in FIG. 2 can be obtained by crimping the closure zone 17 of the rigid strength member 10 onto the flexible wall 16, thus closing the hydraulic compartment.

Thereafter, the connection piece 2 is overmolded onto said assembled hydraulic element 4, and where appropriate also onto the limiter member 3, during the final step of the method of the invention. The hydraulic element 4 is placed in a mold, optionally together with the fastener means 5 for the connection piece 2. The hydraulic element 4 may optionally be compressed during this step if it is desired to obtain a compression prestress effect, as described above. The plastics material is then cast into the mold, and after the material has set the assembly is extracted from the mold.

Because of the shape of the connection piece 2 and of the limiter member 3, their absence simplifies the steps of filling and assembling the assembly. Furthermore, the space occupied by the hydraulic element 4 prior to the overmolding step is smaller, thereby facilitating transport and storage of the assembled and filled hydraulic elements 4 ready for having the connection piece overmolded thereon. In addition, this connection piece increases the leaktightness of the closure zone 17.

Figure 4:
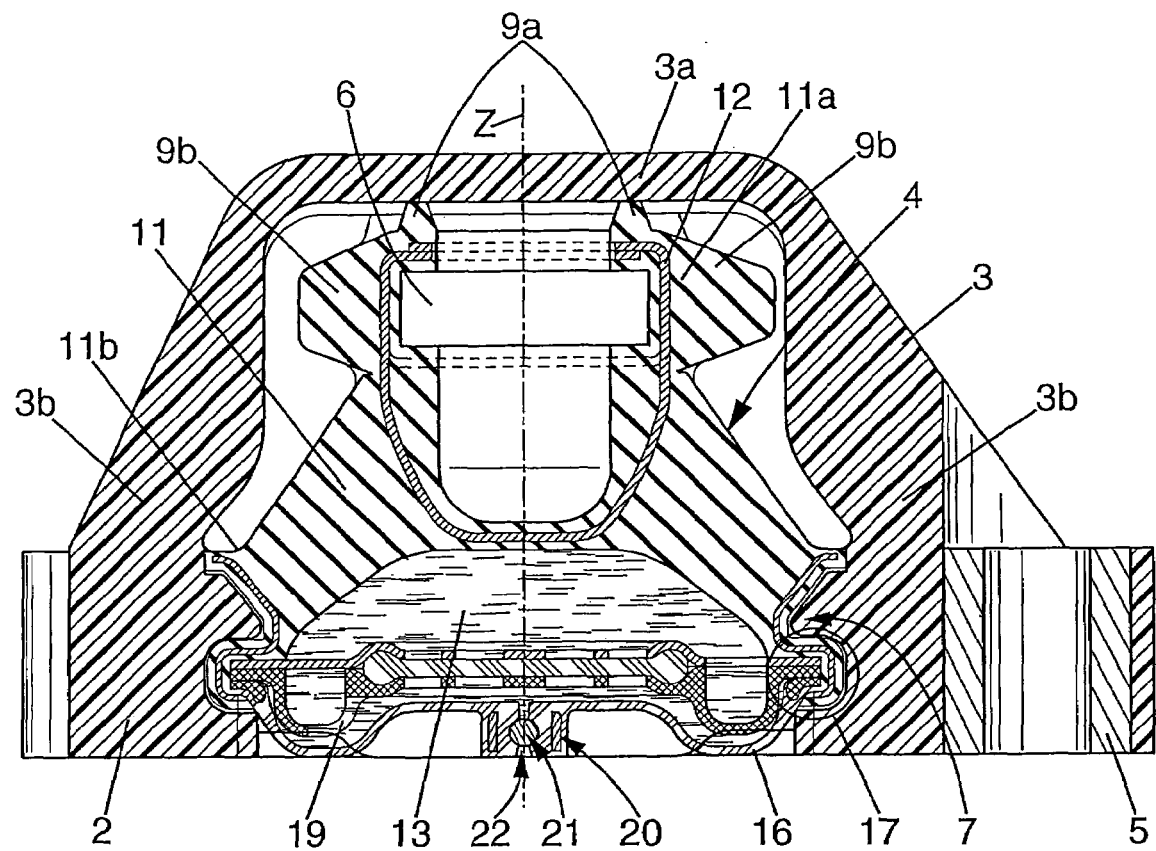
FIG. 4 is a vertical section through a device constituting a second embodiment of the invention.

Another embodiment is shown in FIG. 4. This device is equivalent to that shown in FIG. 3 except that it includes a filler orifice 22. This filler orifice 22 may optionally be formed through the flexible wall 16 and closed by a ball 21 of diameter greater than the filler orifice 22. An annular strength member 20, e.g. embedded in the flexible wall 16 can serve to hold the flexible wall 16 against the ball 21, thus ensuring leaktightness against variations in pressure.

During manufacture of this antivibration device 1, the connection piece body 11 is initially formed around the two strength members 10 and 12, e.g. by molding. Thereafter, the separately-assembled partition 15 can be placed in the connection piece body 11 at its base 11b. Thereafter, the closure zone 17 of the rigid strength member 10 is crimped onto the flexible wall 16.

Thereafter, in a first variant of the manufacturing method, the connection piece 2, and where appropriate the limiter member 3, are overmolded on the assembled but not yet filled hydraulic element 4. The hydraulic element 4 is placed in a mold, possibly together with the fastener means 5 for the connection piece 2. The hydraulic element 4 may optionally be compressed during this step if it is desired to obtain a compression prestress effect, as described above. The plastics material is then cast into the mold, and after the material has set the assembly is extracted from the mold.

Thereafter, the hydraulic compartment can be filled with liquid, such as glycol, via the filler orifice 22, e.g. by using a nozzle. For this purpose, the nozzle can be used to evacuate the hydraulic compartment and then to inject the liquid so that the working and compensation chambers 13 and 14 are filled. Finally, the nozzle optionally places a ball 21 in the orifice 22, thereby closing the hydraulic compartment in leaktight manner.

In a second variant method of manufacturing this device, after the partition 15 and the flexible wall 16 have been assembled, the hydraulic compartment can be filled with liquid as before, e.g. by means of a nozzle. Then the nozzle optionally places a ball 21 in the orifice 22 so as to close the hydraulic compartment in leaktight manner. Only then does this assembled and filled hydraulic element 4 have the connection piece 2, and where appropriate the limiter member 3, overmolded thereon using an overmolding method that is substantially identical.

What is claimed is:

1. A method of manufacturing an antivibration device for being interposed between first and second elements for damping and connection purposes, and antivibration device comprising a hydraulic element, itself comprising:

first and second strength members adapted to be fastened respectively to the first and second elements, the second strength member being annular and centered on a central axis:

an elastomer body interconnecting the first and second strength members, said elastomer body being substantially bell-shaped and extending along said central axis between a top secured to the first strength member and an annular base, said annular base being centered on said central axis and secured to the second strength member; and a leaktight hydraulic compartment filled with liquid, defined by the elastomer body and by a flexible closure wall fastened to the second strength member by at least one radial closure zone which is centered on said central axis, said hydraulic compartment comprising:

firstly a working chamber filled with liquid and defined by the elastomer body; and secondly a compensation chamber filled with liquid, separated from the working chamber by a partition which is substantially perpendicular to the central axis and which is fixed to the annular base of the elastomer body, said compensation chamber communicating with the working chamber, said compensation chamber being defined at least in part by the closure wall, said working chamber being superposed to said compensation chamber along the central axis;

the method presenting at least the following steps:
- an assembling step in which the elastomer body is assembled with the first and second strength members;
- a fastening step in which the closure wall is fastened to the second strength member and the partition is fastened to the base of the elastomer body; and then
- an overmolding step in which a rigid connection piece of plastics material is overmolded onto an exterior of the second strength member and covering the radial closure zone at least in part for reinforcing tightness of said leaktight compartment, said connection piece being adapted to connect said second strength members to said second element.

2. A method according to claim 1, further comprising a filling step in which the hydraulic compartment is filled with liquid, said filling step being performed between said assembling and fastening steps, with the closure wall closing the hydraulic compartment in leaktight manner during the fastening step.

3. A method according to claim 1, further comprising the following steps:
- a filling step in which the hydraulic compartment is filled with liquid through a filler duct; and
- a closing step in which the hydraulic compartment is closed in leaktight manner by closing the filler duct;

in which method the filling and closing steps are performed after the fastening step.

4. A method according to claim 3, in which the filling and closing steps are performed after the overmolding step.

5. A method according to claim 3, in which the filling and closing steps are performed before the overmolding step.

6. A method according to claim 1, in which the second strength member includes a closure zone for securing said second strength member to the closure wall, and during overmolding step e) the plastics material connection piece is overmolded at least in part over said closure zone.

7. A method according to claim 1, in which the plastics material connection piece is secured to fastener members adapted to be fastened to the second element, which fastener members have the plastics material connection piece overmolded thereon during the overmolding step.

8. A method according to claim 1, in which, during the assembling step, the first and second strength members are coated with an elastomer layer.

9. A method according to claim 1, in which the plastics material connection piece is secured to a stroke limiter member adapted to limit relative movement between the first and second strength members.

10. A method according to claim 9, in which the limiter member is molded out of plastics material during the overmolding step integrally with the connection piece.

11. A method according to claim 9, in which the elastomer body is prestressed in compression during the overmolding step and the limiter member maintains compression prestress on the elastomer body after the overmolding step.

12. A method according to claim 9, in which the plastics material connection piece extends substantially perpendicularly to said central axis, and the limiter member of arcuate shape comprises:
- two ends secured to the plastics material connection piece on either side of the elastomer body; and
- a top covering the top of the elastomer body and the first strength member.

13. A method according to claim 1, in which, during the fastening step, at least a closure zone belonging to the second strength member is crimped onto the flexible wall and the partition, and during the overmolding step, the plastics material connection piece is overmolded on the second strength member so as to cover said crimped closure zone, at least in part.

14. An antivibration device for interposing between first and second elements for damping and connection purposes, said antivibration device comprising a hydraulic element itself comprising:
- first and second strength members adapted to be fastened respectively to the first and second elements, the second strength member being annular and centered on a central axis;
- an elastomer body interconnecting the first and second strength members, said elastomer body being substantially bell-shaped and extending along said central axis between a top secured to the first strength member and an annular base, said annular base being centered on said central axis and secured to the second strength member; and
- a leaktight hydraulic compartment filled with liquid, defined by the elastomer body and by a flexible closure wall, said closure wall being secured to the second strength member by at least one radial closure zone which is centered on said central axis, said hydraulic compartment comprising:
  - firstly a working chamber filled with liquid and defined by the elastomer body; and
  - secondly a compensation chamber filled with liquid, separated from the working chamber by a partition which is substantially perpendicular to the central axis and which is fixed to the annular base of the elastomer body, said compensation chamber communicating with the working chamber, said compensation chamber being defined at least in part by the closure wall, said working chamber being superposed to said compensation chamber along the central axis;
- the device further comprising a rigid connection piece of plastics material radially overmolded onto an exterior of the second strength member and covering the radial closure zone at least in part for reinforcing tightness of said leaktight compartment, said connection piece being adapted to connect said second strength member to said second element.

15. An antivibration device according to claim 14, in which the plastics material connection piece is secured to fastener members suitable for being fastened to the second element, said fastener members being overmolded by the plastics material connection piece.

16. A device according to claim 14, in which the elastomer body includes a fine layer of elastomer coating the second strength member at least in part and interposed between the second strength member and the connection piece.

17. A device according to claim 14, in which the hydraulic element presents a peripheral groove into which the connection piece penetrates.

18. An antivibration device according to claim 14, in which the plastics material connection piece is secured to a stroke limiter member adapted to limit relative movement between the first and second strength members.

19. An antivibration device according to claim 18, in which the limiter member is integrally molded out of plastics material together with the connection piece.

20. An antivibration device according to claim 18, in with the limiter member maintains compression prestress on the elastomer body.

21. An antivibration device according to claim 18, in which the plastics material connection piece extends substantially perpendicularly to said central axis, and the limiter member of arcuate shape comprising:

two ends secured to the plastics material connection piece on either side of the elastomer body; and a top covering the top of the elastomer body and the first strength member.

22. A device according to claim 14, in which the closure zone belongs to the second strength member, and said closure zone is crimped to the flexible wall and the partition.

\* \* \* \* \*